(12) United States Patent
Baker

(10) Patent No.: US 6,224,478 B1
(45) Date of Patent: May 1, 2001

(54) CLIMATE CONTROL SYSTEM

(75) Inventor: Roger Keith Baker, Solihull (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/387,442

(22) Filed: Sep. 1, 1999

(30) Foreign Application Priority Data

Sep. 4, 1998 (GB) .................................................. 9819212

(51) Int. Cl.$^7$ .................................................. B61D 27/00
(52) U.S. Cl. ........................................ 454/75; 237/12.3 R
(58) Field of Search .................. 454/75, 143; 237/12.3 R

(56) References Cited

U.S. PATENT DOCUMENTS

| 5,156,204 | 10/1992 | Doi . |
| 5,186,387 | 2/1993 | Doi et al. . |

FOREIGN PATENT DOCUMENTS

| 0 031 518 A1 | 12/1980 | (EP) . |
| 0031518 A1 | 7/1981 | (EP) . |
| 2 297 155 | 7/1996 | (GB) . |

*Primary Examiner*—Harold Joyce
*Assistant Examiner*—Derek S. Boles
(74) *Attorney, Agent, or Firm*—Davis and Bujold

(57) ABSTRACT

A climate control system for a vehicle is disclosed, in which an air flow direction flap 34 is arranged in use to operate in accordance with a control quotient so as to present an air flow in a range of orientations. The orientations are arranged in groups which comprise base orientation levels 1, 2, 3, 4 and at least one group of intermediate orientation levels 110, 111; 220, 222; 330, 333 between two neighbouring said base orientation levels 1, 2, 3, 4. In moving between said neighbouring base orientation levels 1, 2, 3, 4, said air flow directing flap 34 passes, at least transiently, through substantially each said intermediate orientation level 110, 111; 220, 222; 330, 333, whereby a variation in said presentation of said air flow A/F between said neighbouring base orientations appears to a user to be more gradual than would be a substantially stepped change if made directly therebetween.

11 Claims, 3 Drawing Sheets

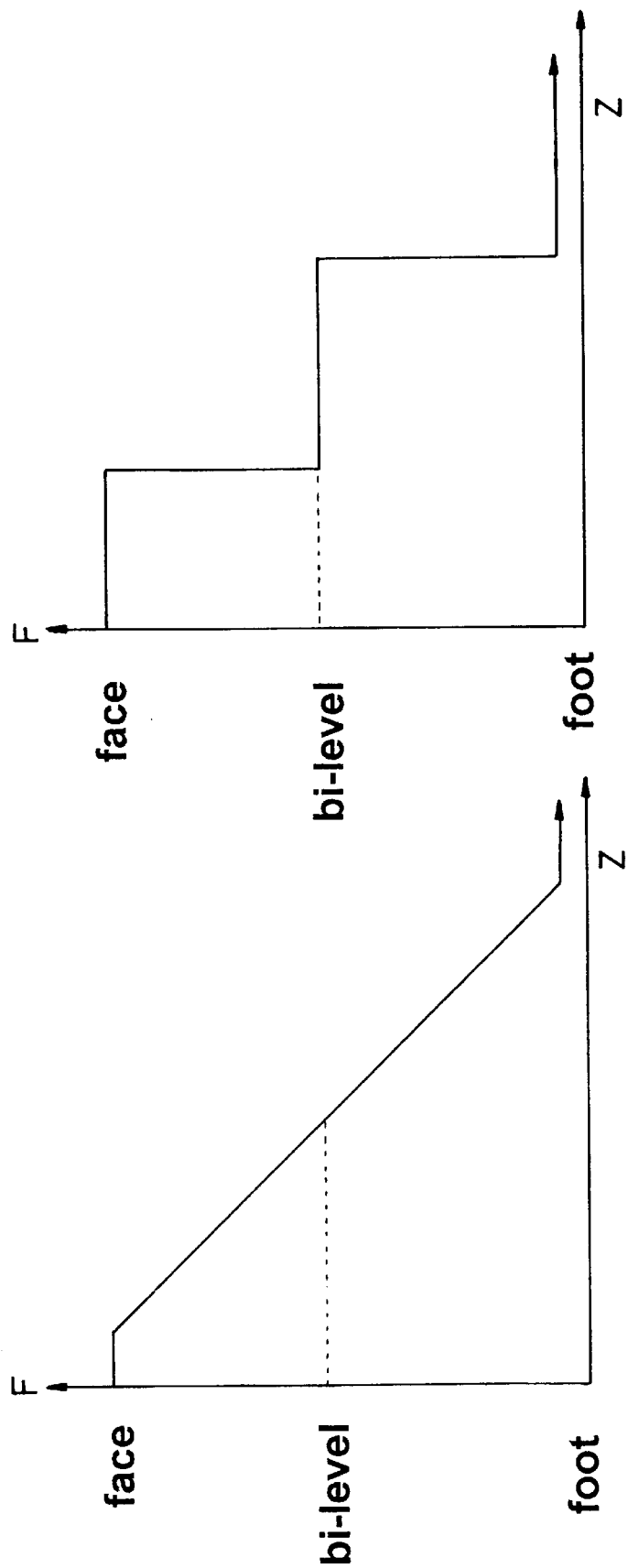

CLIMATE CONTROL SYSTEM

FIELD OF THE INVENTION

This invention relates to climate control systems and in particular, but not exclusively, to a climate control system which is suitable for use in a vehicle.

BACKGROUND OF THE INVENTION

The objective of a climate control system is to provide a comfortable environment to a vehicle occupant, whilst being relatively unobtrusive and avoiding sudden and/or severe changes which may distract the vehicle occupant, along with providing efficient usage of the climate control system equipment.

It will be appreciated that increasingly more sophisticated climate control systems are being incorporated within vehicles, in order to provide comfort and convenience for their users. It is necessary, however, to appropriately direct airflows from such a climate control system in order to maximise performance. It may, for example, prove desirable to defrost/demist window surfaces within the vehicle prior to heating/cooling of the cabin and, in such circumstances, it would be necessary to direct the air flows towards those surfaces.

Major changes between air flow directions may appear to be relatively unpleasant to a user, particularly if the air flow is heated or cooled, e.g. foot level to face level changes.

A sophisticated climate control system could, as depicted in FIG. 1, continuously calculate a control quotient Z in order to set a distribution F of a flap means between a foot level, a bi-level and a face level in order to direct the flow most appropriately.

As can be appreciated from FIG. 1, however, use of a substantially linear relationship for the control quotient Z means you need sophisticated feedback arrangements to provide substantially absolute positional control of flap drive mechanisms, e.g. using servo motors, in order to provide satisfactory bi-level control.

It will be appreciated that calculation of such a control quotient Z for absolute positional determination often includes consideration of a range of environmental factors, such as internal temperature, external temperature, desired temperature, solar load and air flow speed. Thus, a relatively complicated relationship may have to be used in order to continuously derive the control quotient Z and thus adjust, through servo motor control across substantially the whole range, an absolute bi-level position for air flow direction and orientation F. Such sophistication within the climate control system can be expensive and cumbersome.

It will also be appreciated that, typically, environmental conditions within vehicles will not change very rapidly. Thus, the calculation of the control quotient Z will precipitate relatively marginal differentials between actual successive determinations of the value of Z. In previous systems, such as the one as described above with regard to FIG. 1, these marginal changes in the control quotient Z precipitate a reciprocally marginal change in the bi-level position, determined through accurate servo motor control of the air direction flap. Thus, the motor and direction flap are repeatedly altered for only marginal differences in performance.

One example of a quite sophisticated climate control system is disclosed in U.S. Pat. No. 5,156,204 and it is used to provide an appropriate temperature distribution between ventilation used for users and that used for defrosting.

Instead of the absolute determination of a bi-level position F on a linear slope between face level and foot level, a cheaper system might use exclusive orientations and a possible such arrangement is depicted in FIG. 2. In this manner, the climate control system still has a face level, a foot level and a bi-level position but uses a less cumbersome control relationship to derive its control quotient Z. In this case, the control quotient Z is approximated to the nearest exclusive orientation, i.e. foot, face or bi-level.

Although complicated methods of controlling the setting of the flaps are no longer necessary, there is a price to pay in terms of user comfort/convenience. With such cheaper systems there is a noticeable transition between respective foot level, bi-level and face level orientations. This can be particularly uncomfortable for a user when the airflow from the vents is significantly cooler or hotter than the air presently around him. For example, in a simpler system of the type shown in FIG. 2, upon determination of a value for the control quotient Z, a relatively minor change in value may lead to a massive step between the foot level and bilevel, followed by the bi-level to face level and vice-versa.

SUMMARY OF THE INVENTION

It is an object of this invention to provide an improved climate control system which is suitable for use in a vehicle.

In accordance with the present invention, there is provided a climate control system for a vehicle, the system including an air flow direction means arranged in use to operate according to a control quotient so as to resent an air flow in a range of orientations substantially towards an occupant of said vehicle, a said presentation in a said orientation being dependent upon a plurality of environmental factors which are consolidated into said control quotient, said system being characterised in that said range of orientations are arranged in groups which include at least one base orientation group having a plurality of base orientation levels and at least one intermediate orientation group which comprises one or more intermediate orientation levels between two neighbouring said base orientation levels, and in that said air flow direction means is arranged to pass, if moving between said neighbouring base orientation levels, at least transiently through the or each said intermediate orientation level, whereby a variation in said presentation of said air flow between said neighbouring base orientations appears to a user to be more gradual than would be a substantially stepped change if made directly therebetween.

The air flow direction means may be arranged, while moving between said orientation levels, to dwell at a said orientation level for a predetermined time period. A said predetermined time period spent dwelling at one or more of said base orientation levels may longer than a said time period spent dwelling at one or more said intermediate orientation levels.

Said system may include a rapid start mode of operation in which the number of said base and/or intermediate orientation levels used is reduced.

Said system may further comprise an absolute position placing means arranged in use to place said air flow direction means in substantially absolute operational positions in the region of at least said base orientation levels.

Said system may further comprise a nudging means arranged in use to substantially nudge, push or move said air flow direction means into the or each said intermediate orientation levels between said base orientation levels.

Said environmental factors may include one or more of an interior temperature, an exterior temperature, a solar load, an air flow speed, a desired temperature and vehicle occupancy.

Typically, the control relationship will be:

$$Z = T\text{set}.K1 - Tn.K2 - Tx.K3 - Sol.K4 - K5$$

where:
Tset=set temperature
Tn=in car temperature
Tx=exterior temperature
Sol=solar load; and
K1–5 are tuning coefficients set for a particular climate control installation within a vehicle.

At least one said base orientation group may include at least three base orientation levels. At least one said intermediate orientation group may include at least two intermediate orientation levels. Said range of orientations may include a face level orientation and a foot level orientation.

The invention also provides a vehicle including a climate control system according to the invention.

BRIEF DESCRIPTION OF THE DRAWINGS

An embodiment of the present invention will now be described by way of example only and with reference to FIGS. 1 through 4 of the accompanying drawings, in which FIG. 1 is a graph of a prior art climate control system based on a linear control quotient Z;

FIG. 2 is a graph of a prior art control quotient Z approximated to the nearest exclusive orientation;

DESCRIPTION OF PREFERRED EMBODIMENTS OF THE INVENTION

Figure 3:
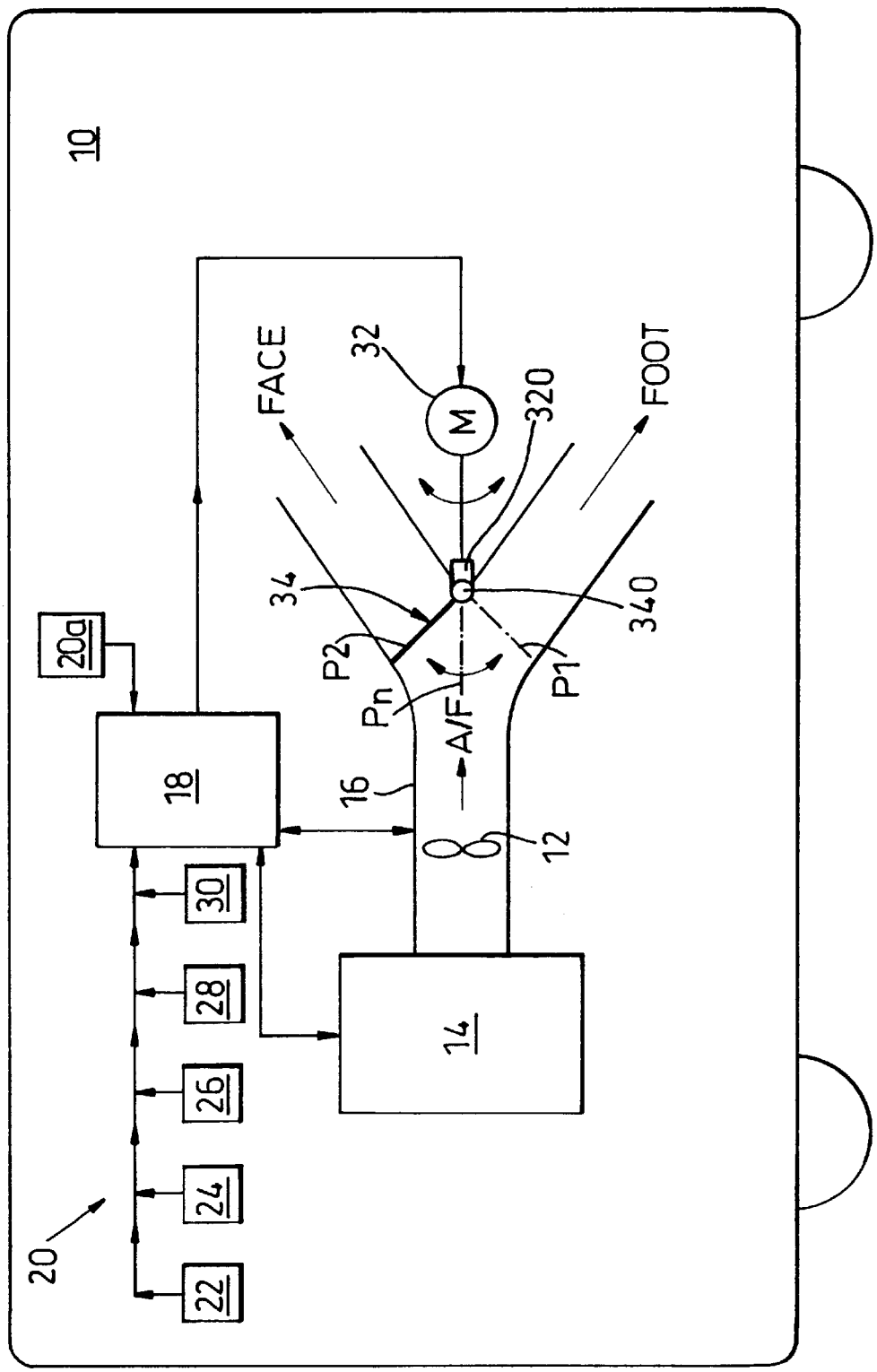
FIG. 3 is a schematic diagram of a vehicle including a climate control system according to the invention.
Figure 4:
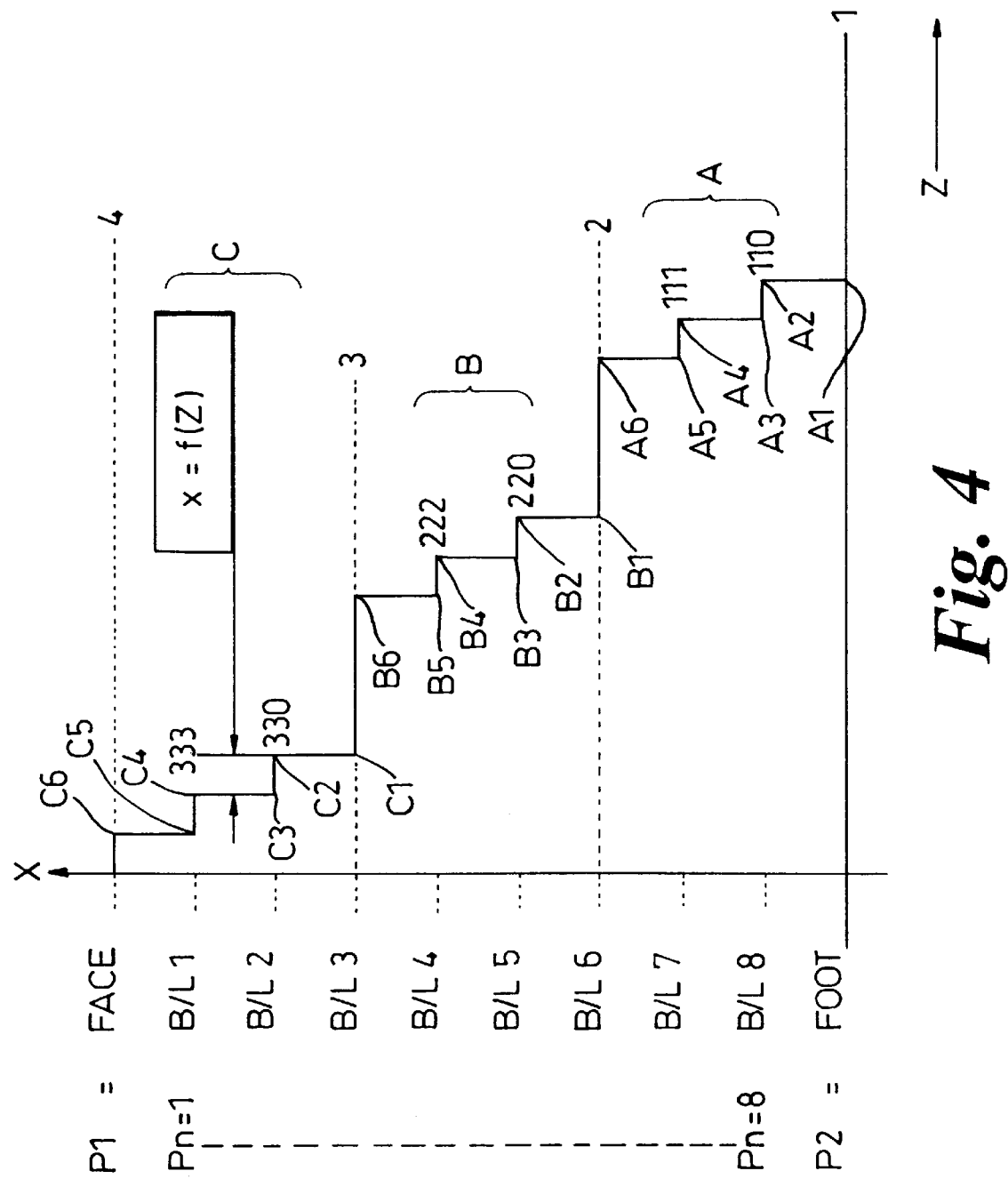
FIG. 4 represents part of a control method of the climate control system of FIG. 3.

Referring now to FIGS. 3 and 4, a vehicle 10 has a climate control system including a blower 12, which provides airflow A/F from an air-conditioner 14 through a main duct 16. The blower 12 and the air-conditioner 14 are both under the control of a controller 18.

The controller 18 receives inputs from an array of sensors 20 which comprises sensors for interior temperature 22, exterior temperature 24, solar load 26, air-flow speed 28 and a user input of desired temperature 30. The controller 18 controls the temperature of the air-flow A/F through its control over the air-conditioner 14 and the speed of the blower 12. It 18 also controls a servo motor 32 so as to move an air-flow direction means in the form of a direction flap 34 between a range of orientations in the form of positions for face P1, foot P2 and intermediate positions Pn (bi-level).

The control is exercised with reference to a control routine which is represented graphically, in the form of an over-view, with particular reference to FIG. 4.

The direction flap 34 is controlled through a relationship or equation which considers; desired set temperature (Tset) as derived from the user input 30, current in-car temperature (Tin) as derived from the interior temperature sensor 22, exterior temperature (Tex) as derived from the exterior temperature sensor 24, and solar load (Sol) as derived from the solar load sensor 26. The system includes consideration of whether front and/or rear volumes of the vehicle are to be involved in the relationship and also the number of vehicle occupants, which information is derived from signals provided by an occupancy sensing means 20a.

These variables are used in order to calculate a control quotient value Z which is then used to control the direction flap 34 along with air flow rate A/F and air temperature through use of the servo motor 32, the blower 12 and the air-conditioner 14 respectively.

A control relationship equation, typical of those suitable, is:

$$Z = T\text{set}.K1 - Tin.K2 - Tx.K3 - Sol.K4 - K5$$

wherein:
Z=control quotient,
Tset=desired set temperature of the vehicle occupant,
Tin=current in-car temperature,
Tx=exterior temperature,
Sol=solar load applied to the vehicle,
K1–K5 are tuning coefficients used in order to vary the control relationship so that it can be specifically adapted to substantially any particular installation within a vehicle or expected climatic conditions, i.e. comparing temperate with equatorial climates.

Referring now in particular to FIG. 4, a base orientation group comprises four base orientation levels 1, 2, 3, 4 for placing the direction flap 34 into substantially absolute operational positions. The absolute positions of "face" and "foot" equate to positions P1 and P2 respectively and in between them P1, P2 are found Bi-Level positions Pn which comprise Bi-Levels 1 to 8 respectively (for n=1 to 8).

Bi-Levels 3, 6 which form part 3, 2 of the base orientation group are substantially absolute positions. These Bi-Levels 3, 6 are convenient absolute orientations of the direction flap 34 which proportion the air flow between foot and face levels in a manner found normally acceptable to a vehicle occupant.

In between the absolute orientations 1, 2, 3, 4 of the base orientation group, are found intermediate orientation groups A, B, C comprising intermediate orientation levels 110, 111; 220, 222; 330, 333, defined as follows; intermediate orientation group A (intermediate orientations 110, 111), intermediate orientation group B (intermediate orientations 220, 222) and intermediate orientation group C (intermediate orientations 330, 333). It will be appreciated that these intermediate orientations 110, 111; 220, 222; 330, 333 need not necessarily be equally spaced. The intermediate orientation levels 110, 111; 220, 222; 330, 333 provide transient levels through which the direction flap 34 must pass in order to reach the serially laid out base orientations 1, 2, 3, 4.

It will be appreciated that if an orientation level (whether a level within the base orientation group or within an intermediate orientation group A, B, C) is considered of value X, then the value of X can be considered a function of the control quotient Z, i.e. X=f (Z) where Z is determined as described previously with regard to the control relationship.

The direction flap 34 dwells at the base orientation levels 1, 2, 3, 4 for longer it does at the intermediate orientation levels 110, 111; 220, 222; 330, 333. The orientation levels as a whole 1, 110, 111, 2, 220, 222, 3, 330, 333, 4 provide a ladder through which the direction flap 34 must pass when moving between foot and face levels P2, P1.

The intermediate orientation levels 110, 111; 220, 222; 330, 333 require successive determinations of the control quotient Z in order to ascend the ladder between consecutive base orientations 1, 2, 3, 4 (or descend it as the case may be). These determinations of the control quotient Z are implemented at each corner of the ladder and are represented in FIG. 4 as A1 to A6, B1 to B6 and C1 to C6 for the respective intermediate orientation groups A, B, C.

The calculation of these determinations of the control quotient Z can be used as a means to vary the time period over which the distribution of the air flow A/F is changed between the base orientation levels 1, 2, 3, 4. It will be appreciated that if more intermediate orientation levels are provided between base orientations 1, 2, 3, 4, then generally the period of broadening will be increased and therefore the perceived rate of change in air flow A/F distribution will be reduced.

As indicated above, the dwell time in terms of the control quotient Z at the base orientations 1, 2, 3, 4 is greater than between intermediate orientations. However, it will also be understood that this dwell is highly determinant upon the tuning coefficients K1 to K5 of the control relationship, as described above, for any particular environment. The tuning coefficients K1 to K5 provide a way of varying the dwell times at each of the base or intermediate orientations. Nevertheless, it will also be appreciated that this control relationship can provide fixed ratios between the various environmental factors and so, although the actual dwell at each base orientation and intermediate orientation may vary in absolute terms between different environmental scenarios, the ratio between these dwell periods could be substantially fixed.

Those skilled in the art will appreciate that, in the embodiment depicted, the six respective intermediate group A, B, C determinations A1 to A6, B1 to B6, C1 to C6 of the control quotient Z are dependent upon a confirmatory double checking of the determination before a change in the directional positioning (i.e. orientation) of the direction flap 34 can be implemented. However, it will be understood that a single determination strategy may be incorporated within the control system, e.g. for rapid start or manual over-ride situations. This may be implemented by reducing the number of intermediate groups A, B, C and/or by reducing the number of intermediate orientations 110, 111; 220, 222; 330, 333 within one or more intermediate groups.

In such a rapid start situation, a minimum of three control quotient Z determinations between neighbouring base orientations would be preferable (i.e. at least a single intermediate step), so as to prevent too excessive a jump between respective base orientations 1, 2, 3, 4. However, it will be appreciated that environmental factors will not vary quickly and thus the inherent broadening or smearing of any such a jump between base orientations 1, 2, 3. 4 will still require significantly more control quotient Z determinations than the previous bi-level situations described by way of example only with regard to FIG. 2.

It will be appreciated that the base orientations 1, 2, 3, 4 are considered the fundamental bi-level air flow directions to a user and so are accurately controlled through a substantially absolute position placing means, which in this embodiment is in the form of the servo motor 32. The intermediate orientations 110, 111, 220, 222, 330, 333 are provided between these accurate and substantially absolute servo motor 32 controlled base orientations 1, 2, 3, 4 by using a nudging means in the form of nudge and catch type control of the direction flap 34. Thus, the servo motor 32 places the direction flap 34 in substantially absolute positions between the base orientations 1, 2, 3, 4 whilst a nudge type actuator 320 pushes, nudges or otherwise moves the direction flap 34 about a direction flap pivot 340 substantially into each of these intermediate orientations 110, 111; 220, 222; 330, 333, and the nudging means may include detent engagement at one or more of the intermediate orientations 110, 111; 220, 222; 330, 333. The servo motor 32 either catches up or precedes these intermediate orientations, in order to catch or release the direction flap 34 at the next base orientation 1, 2, 3, 4.

It can also be seen in FIG. 4 that, in the particular orientation level depicted as x=f(z), the direction flap 34 will have an intermediate level 333, which is equivalent to a bi-level 2 on the ordnance scale x. This intermediate orientation 333 is maintained until an appropriate value of x, in the order of orientational level 333, is achieved. Whether the variation in the direction flap 34 is precipitated on first determination of such a value of x or second, etc. is dependent upon design choice.

What I claim is:

1. A climate control system for a vehicle, the system including an air flow direction means arranged in use to operate according to a control quotient so as to present an air flow in a range of orientations substantially towards an occupant of said vehicle, a said presentation in a said orientation being dependent upon a plurality of environmental factors which are consolidated into said control quotient, said system being characterised in that said range of orientations are arranged in groups which include at least one base orientation group having a plurality of base orientation levels and at least one intermediate orientation group which comprises one or more intermediate orientation levels between two neighbouring said base orientation levels, and in that said air flow direction means is arranged to pass, if moving between said neighbouring base orientation levels, at least transiently through the or each said intermediate orientation level, whereby a variation in said presentation of said air flow between said neighbouring base orientations appears to a user to be more gradual than would be a substantially stepped change if made directly therebetween.

2. A system according to claim 1, wherein said flow direction means is arranged, while moving between said orientation levels, to dwell at a said orientation level for a predetermined time period.

3. A system according to claim 2, wherein a said predetermined time period spent dwelling at one or more of said base orientation levels is longer than a said time period spent dwelling at one or more said intermediate orientation levels.

4. A system according to claim 1, wherein said system includes a rapid start mode of operation in which the number of said base and/or intermediate orientation levels used is reduced.

5. A system according to claim 1, further comprising an absolute position placing means arranged in use to place said air flow direction means in substantially absolute operational positions in the region of at least said base orientation levels.

6. A system according to claim 1, further comprising a nudging means arranged in use to substantially nudge, push or move said air flow direction means into the or each said intermediate orientation levels between said base orientation levels.

7. A system according to claim 1, wherein said environmental factors include one or more of an interior temperature, an exterior temperature, a solar load, an air flow speed, a desired temperature and vehicle occupancy.

8. A system according to claim 1, wherein at least one said base orientation group includes at least three base orientation levels.

9. A system according to claim 1, wherein at least one said intermediate orientation group includes at least two intermediate orientation levels.

10. A system according to claim 1, said range of orientations including a face level orientation and a foot level orientation.

11. A vehicle including a climate control system as claimed in claim 1.

* * * * *